(12) United States Patent
Yan et al.

(10) Patent No.: US 12,437,961 B2
(45) Date of Patent: Oct. 7, 2025

(54) MACHINE VISION-BASED AUTOMATIC FOCUSING AND AUTOMATIC CENTERING METHOD AND SYSTEM

(71) Applicant: East China University of Science and Technology, Shanghai (CN)

(72) Inventors: Yabin Yan, Shanghai (CN); Fuzhen Xuan, Shanghai (CN); Ting Su, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 447 days.

(21) Appl. No.: 17/976,344

(22) Filed: Oct. 28, 2022

(65) Prior Publication Data

US 2024/0062988 A1  Feb. 22, 2024

(30) Foreign Application Priority Data

Aug. 22, 2022 (CN) .......................... 202211007236.9

(51) Int. Cl.
*H01J 37/21* (2006.01)
*G06T 7/70* (2017.01)
*H01J 37/20* (2006.01)

(52) U.S. Cl.
CPC ................ *H01J 37/21* (2013.01); *G06T 7/70* (2017.01); *H01J 37/20* (2013.01)

(58) Field of Classification Search
CPC ........ H01J 37/21; H01J 37/20; H01J 2237/21; H01J 2237/216
See application file for complete search history.

(56) References Cited

U.S. PATENT DOCUMENTS

| | | | |
|---|---|---|---|
| 2010/0208091 A1* | 8/2010 | Chang .................. | H04N 23/611 348/222.1 |
| 2020/0118786 A1* | 4/2020 | Mueller ................ | H01J 37/263 |
| 2021/0168348 A1* | 6/2021 | Laganakos ........... | H04N 23/959 |

OTHER PUBLICATIONS

Mitchell Riley, Deriving the 5-Point Skewed Stencil Equation for Finite Difference Approximation of the Laplacian, Mar. 18, 2020, https://mitchr.dev/2020/03/18/skewedLaplaceSquare.html (Year: 2020).*

(Continued)

*Primary Examiner* — David E Smith
(74) *Attorney, Agent, or Firm* — Terry M. Sanks, Esq.; Beusse Sanks, PLLC (57) ABSTRACT

The present disclosure provides a machine vision-based automatic focusing and automatic centering method and system. An object stage is controlled to move in an imaging distance range of an electron microscope, and images scanned by the electron microscope when the object stage is at different imaging distances are acquired. The image definition of an object stage image is calculated according to a gray-scale value of each pixel in the object stage image, the imaging position when an image definition value is the maximum is determined, and the object stage is controlled to move to the position to realize machine vision-based accurate focusing. After the accurate focusing is completed, the images that can clearly reflect the arrangement relationship between an indenter and a sample on the object stage are acquired by the electron microscope, and a midline of an indenter area and a midline of a sample area are aligned.

13 Claims, 5 Drawing Sheets

(56) References Cited

OTHER PUBLICATIONS

Yang and Li, "A Rapid Auto-Focus Method in Automatic Microscope", ICSP2008 Proccedings, https://ieeexplore.ieee.org/abstract/document/4697180 (Year: 2008).*

* cited by examiner

MACHINE VISION-BASED AUTOMATIC FOCUSING AND AUTOMATIC CENTERING METHOD AND SYSTEM

TECHNICAL FIELD

The present disclosure relates to the technical field of machine vision-based automatic control, and in particular, to a machine vision-based automatic focusing and automatic centering method and system.

BACKGROUND

In a micro-nano scale mechanical test, the operation of a focused ion beam-Scanning Electron Microscope (SEM) system is very complex. One who wants to operate the system skillfully, should be subjected to professional training and have some experience. Before the micro-nano scale mechanical test, an electron microscope needs to be focused first, so that a sample can be seen clearly, and a midline of an indenter and a midline of the sample need to be aligned. These two processes are commonly known as focusing and centering. At a current stage, the focusing and centering are generally adjusted manually. During the focusing, even for experienced people, a focal length is also adjusted manually by virtue of experience without any specific standard. During the centering, the midline of the sample and the midline of the indenter are aligned by manually adjusting the movement of a sample stage, which not only takes a long time, but also cannot avoid minor errors caused by human factors.

SUMMARY

An objective of some embodiments is to provide a machine vision-based automatic focusing and automatic centering method and system, which realizes automatic focusing and centering, and effectively avoids minor errors caused by human factors.

In order to achieve the abovementioned objective, the present disclosure provides the following solutions:

A machine vision-based automatic focusing method includes:
- controlling an object stage to move in an imaging distance range of an electron microscope, so as to change an object distance between the object stage and the electron microscope;
- acquiring object stage images scanned by the electron microscope when the object distance between the object stage and the electron microscope changes;
- for each object stage image, calculating image definition of the object stage image according to a gray-scale value of each pixel in the object stage image; and
- assuming an imaging position corresponding to the object stage image with the maximum image definition among the plurality of object stage images as a target imaging position, and controlling the object stage to move to the target imaging position.

Optionally, the calculating the image definition of the object stage image according to a gray-scale value of each pixel in the object stage image includes:
- performing template convolution on the object stage image by using a Laplace operator, so as to obtain a high-frequency component of the object stage image; and
- calculating an image definition value of the object stage image according to an image definition evaluation function and the high-frequency component of the object stage image.

Optionally, the Laplace operator is as shown in following formula:

$$z(x,y)=g(x-1,y)+g(x+1,y)+g(x,y-1)+g(x,y+1)-4g(x,y) \quad x \in [1,M-1], y \in [1,N-1]$$

where g(x, y) is a gray-scale value of a pixel point (x, y) in the object stage image, M is a number of pixel columns of the object stage image, N is a number of pixel rows of the object stage image, and $z(x, y)$ is a gray-scale value at the pixel point (x, y) in the high-frequency component of the object stage image.

Optionally, the image definition evaluation function is as shown in following formula:

$$f = \frac{1}{MN}\sum_{(x,y)} z(x, y)$$

where f is the image definition value of the object stage image, M is the number of pixel columns of the object stage image, N is the number of pixel rows of the object stage image, and $z(x, y)$ is the gray-scale value at the pixel point (x, y) in the high-frequency component of the object stage image.

Optionally, the calculating image definition of the object stage image according to a gray-scale value of each pixel in the object stage image includes:
- for each pixel point in the object stage image, performing a difference operation on the gray-scale value of the pixel point and gray values of a plurality of pixel points adjacent to the pixel point to obtain a gray-scale variation of the pixel point; and
- determining an image definition value of the object stage image according to the gray-scale variation of each pixel point in the object stage image.

Optionally, the gray-scale variation of each pixel point in the object stage image is calculated according to following formula:

$$G(x,y)=|g(x,y)-g(x+1,y)|+|g(x,y)-g(x,y+1)|$$

where G(x, y) is the gray-scale variation at the pixel point (x, y) in the object stage image, and g(x, y) is the gray-scale value at the pixel point (x, y) in the object stage image.

In another aspect, the present disclosure further provides a machine vision-based automatic centering method includes:
- performing the automatic focusing method as described above;
- controlling the electron microscope to scan and acquire the object stage image, where the object stage image includes an indenter and a sample arranged opposite to the indenter, a traveling direction of the indenter is perpendicular to a fixing plane of the sample, and an imaging direction of the electron microscope is perpendicular to the traveling direction of the indenter;
- performing preprocessing on the object stage image to obtain a preprocessed image, where the preprocessing includes filtering processing, noise elimination processing, and binarization processing performed in sequence;
- performing connected component detection on the preprocessed image to determine an indenter area and a sample area;
- selecting an arbitrary point in the object stage image as an origin O, and establishing a rectangular plane coordinate system XOY by assuming a straight line that passes through the origin O and is parallel to the traveling direction of the indenter as an X axis and a straight line that passes through the origin O and is perpendicular to the X axis as a Y axis;

respectively determining a midline of the indenter area and a midline of the sample area, where both the midline of the indenter area and the midline of the sample area are parallel to the X axis and perpendicular to the Y axis; and controlling the midline of the sample area to coincide with the midline of the indenter area according to the distance between the midline of the indenter area and the midline of the sample area.

Optionally, the midline of the indenter area is determined according to following formula:

$$y_{indenter} = \frac{\sum_{i=1}^{n} y_i}{n}$$

where $y_{indenter}$ is the midline of the indenter area, $y_i$ is a Y-axis coordinate of a ith pixel in the indenter area, and n is a number of the pixels in the indenter area;

the midline of the sample area is determined according to following formula:

$$y_{sample} = \frac{\sum_{j=1}^{m} y_j}{m}$$

where $y_{sample}$ is the midline of the sample area, $y_j$ is a Y-axis coordinate of a jth pixel in the sample area, and m is a number of the pixels in the sample area.

Corresponding to the machine vision-based automatic focusing method described above, the present disclosure further provides a machine vision-based automatic focusing system. The machine vision-based automatic focusing method as described above is run when the automatic focusing system is implemented by a computer.

Corresponding to the machine vision-based automatic centering method described above, the present disclosure further provides a machine vision-based automatic centering system. The machine vision-based automatic centering method as described above is run when the automatic centering system is implemented by a computer.

According to specific embodiments provided by the present disclosure, the present disclosure discloses the following technical effects:

The present disclosure provides a machine vision-based automatic focusing and automatic centering method and system. According to the machine vision-based automatic focusing method of the present disclosure, an object stage is controlled to move in an imaging distance range of an electron microscope, and images scanned by the electron microscope when the object stage is at different imaging distances are acquired. The image definition of an object stage image is calculated according to a gray-scale value of each pixel in the object stage image, the imaging position when an image definition value is the maximum is determined, and the object stage is controlled to move to the position, so as to realize machine vision-based accurate focusing. After the accurate focusing is completed, the images that can clearly reflect the arrangement relationship between an indenter and a sample on the object stage are acquired by the electron microscope, and a midline of an indenter area and a midline of a sample area are aligned, so as to realize machine vision-based accurate centering, which avoids the problems of low efficiency and poor accuracy in manual focusing and centering, and improves the focusing and centering efficiency.

BRIEF DESCRIPTION OF THE DRAWINGS

To describe the technical solutions in the embodiments of the present disclosure or in the prior art more clearly, the following briefly describes the drawings required for describing the embodiments. Apparently, the drawings in the following description are merely some embodiments of the present disclosure, and those of ordinary skill in the art may still derive other drawings from these drawings without creative efforts.

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

An objective of the present disclosure is to provide a machine vision-based automatic focusing and automatic centering method and system, which realizes automatic focusing and centering, and effectively avoids minor errors caused by human factors.

In order to make the abovementioned objective, features, and advantages of the present disclosure more apparent and more comprehensible, the present disclosure is further described in detail below with reference to the drawings and specific embodiments.

Embodiment 1

Figure 1:
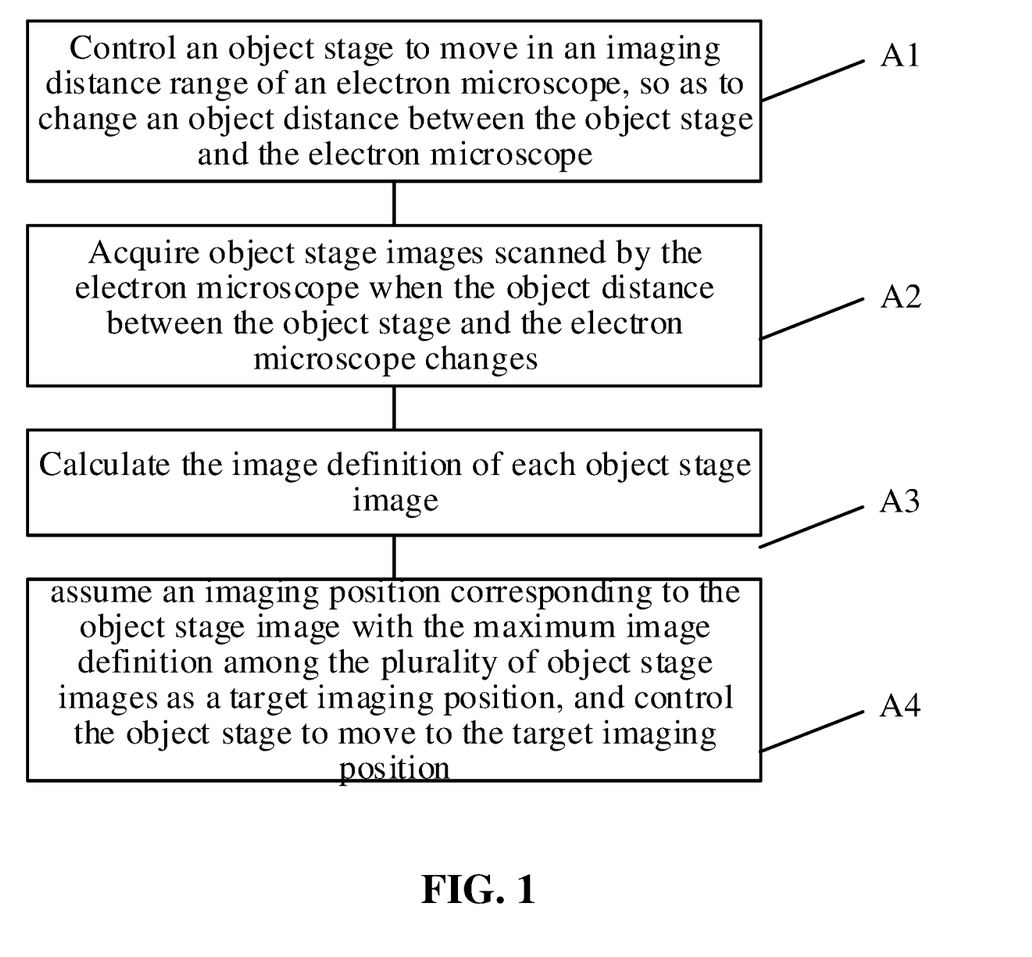
FIG. 1 is a flowchart of a machine vision-based automatic focusing method according to Embodiment 1 of the present disclosure.

The present embodiment provides a machine vision-based automatic focusing method, as shown in the flowchart in FIG. 1, the automatic focusing method includes the following steps A1 to A4.

In step A1, an object stage is controlled to move in an imaging distance range of an electron microscope, so as to change an object distance between the object stage and the electron microscope. That is to say, the object stage is moved from a lower limit position to an upper limit position of the electron microscope.

In step A2, object stage images scanned by the electron microscope are acquired when the object distance between the object stage and the electron microscope changes, so as to obtain a plurality of object stage images. In some embodiments, after the object stage images are acquired, the method may further include a step of performing Fourier filtering on the acquired images.

In step A3, image definition of each object stage image is calculated. For any object stage image, the image definition of the object stage image is calculated according to a gray-scale value of each pixel in the object stage image.

In step A4, an imaging position corresponding to the object stage image with the maximum image definition among the plurality of object stage images is taken as a target imaging position, and the object stage is controlled to move to the target imaging position.

In the present embodiment, the step A3 in which the image definition of the object stage image is calculated according to the gray-scale value of each pixel in the object stage image specifically includes the following step A31 to A32.

In step A31, template convolution is performed on the object stage image by using a Laplace operator, so as to obtain a high-frequency component of the object stage image. Specifically, in the present embodiment, the Laplace operator is as shown in the following formula:

$$z(x,y)=g(x-1,y)+g(x+1,y)+g(x,y-1)+g(x,y+1)-4g(x,y)$$
$$x\in[1,M-1], y\in[1,N-1]$$

where $g(x, y)$ is a gray-scale value of a pixel point $(x, y)$ in the object stage image, M is a number of pixel columns of the object stage image, N is a number of pixel rows of the object stage image, and $z(x, y)$ is a gray-scale value at the pixel point $(x, y)$ in a high-frequency component of the object stage image.

There are two gradient operators respectively in the horizontal direction and in the vertical direction, and there is only one high-pass filter operator.

A corresponding operator matrix is:

$$\begin{bmatrix} 0 & 1 & 0 \\ 1 & -4 & 1 \\ 0 & 1 & 0 \end{bmatrix}.$$

In step A32, an image definition value of the object stage image is calculated according to an image definition evaluation function and the high-frequency component of the object stage image. Specifically, in the present embodiment, the image definition evaluation function is as shown in the following formula:

$$f = \frac{1}{MN}\sum_{(x,y)} z(x, y),$$

where f is an image definition value of the object stage image, M is the number of pixel columns of the object stage image, N is the number of pixel rows of the object stage image, and $z(x, y)$ is the gray-scale value at the pixel point $(x, y)$ in the high-frequency component of the object stage image.

Figure 2:
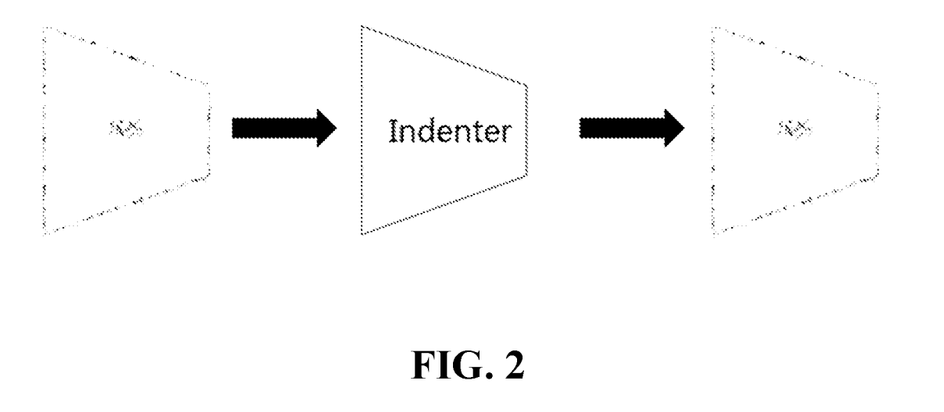
FIG. 2 is a schematic diagram of an image changing along with an object distance in the automatic focusing method according to Embodiment 1 of the present disclosure.
Figure 3:
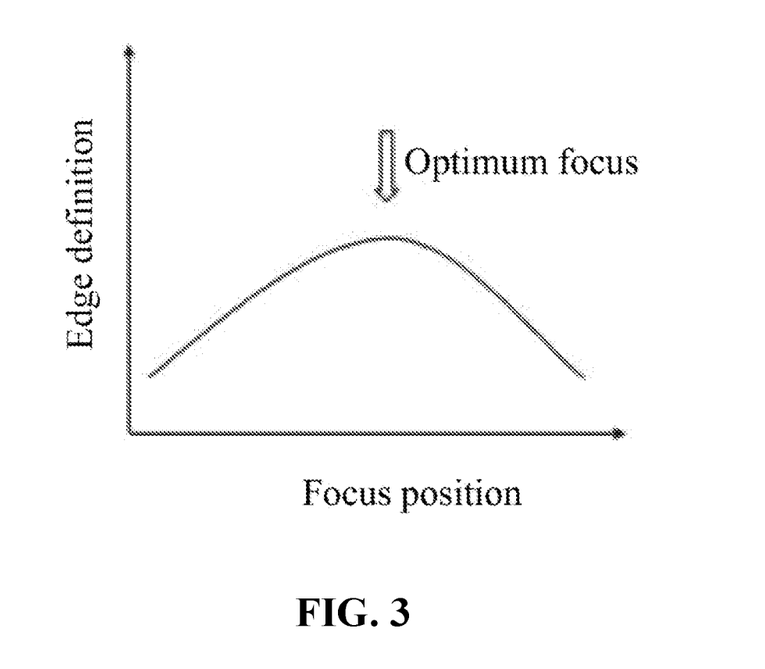
FIG. 3 is a schematic diagram of the change of image definition in the automatic focusing method according to Embodiment 1 of the present disclosure.

In a process of determining the image definition, an apparatus continuously drives an object stage to change the object distance of the electron microscope. In a process that the image definition value changes from small to large and then to small, as shown in FIG. 2, it can be found that the definition of the indenter edge goes through a process from blur to clear to blur. In order to evaluate the image definition in this process, a curve of the image definition value changing with the object distance is shown in FIG. 3. It can be seen from the figure that the curve has only one maximum value, and the focal length of an SEM is driven back to the position with the maximum image definition value, that is, an automatic focusing position.

In a process of realizing an automatic focusing function, the object distance is constantly changing, which cannot ensure that a complete object stage image to be processed is acquired. Therefore, the object stage image acquired by the SEM needs to be subjected to preliminary processing, such as setting a target area so that only the indenter and sample images to be processed are retained, to reduce the calculation amount.

Embodiment 2

The present embodiment is substantially the same as the solution in Embodiment 1, and the difference is that, in the present embodiment, the step in which the image definition of the object stage image is calculated according to the gray-scale value of each pixel in the object stage image, specifically includes that the following step.

For any pixel point in the object stage image, a difference operation is performed on the gray-scale value of the pixel point and the gray values of a plurality of pixel points adjacent to the pixel point to obtain a gray-scale variation of the pixel point. In the present embodiment, the gray-scale variation of any pixel point in the object stage image is calculated according to the following formula:

$$G(x,y)=|g(x,y)-g(x+1,y)|+|g(x,y)-g(x,y+1)|,$$

where $G(x, y)$ is a gray-scale variation at the pixel point $(x, y)$ in the object stage image, and $g(x, y)$ is the gray-scale value at the pixel point $(x, y)$ in the object stage image. The absolute value of the difference is a substitute for the power and the root. That is, the difference operation is performed on the gray values of the point $(x, y)$ and the points adjacent thereto, so as to extract the change amplitude of the gray-scale value of the point $(x, y)$.

An image definition value of the object stage image is determined according to the gray-scale variation of each pixel point in the object stage image. In the present embodiment, the image definition value of the object stage image is determined according to the following formula:

$$\Sigma_y \Sigma_x |G(x,y)|,$$

where the value ranges of x and y are respectively the number of pixel rows and the number of pixel columns of the object stage image.

Embodiment 3

Figure 4:
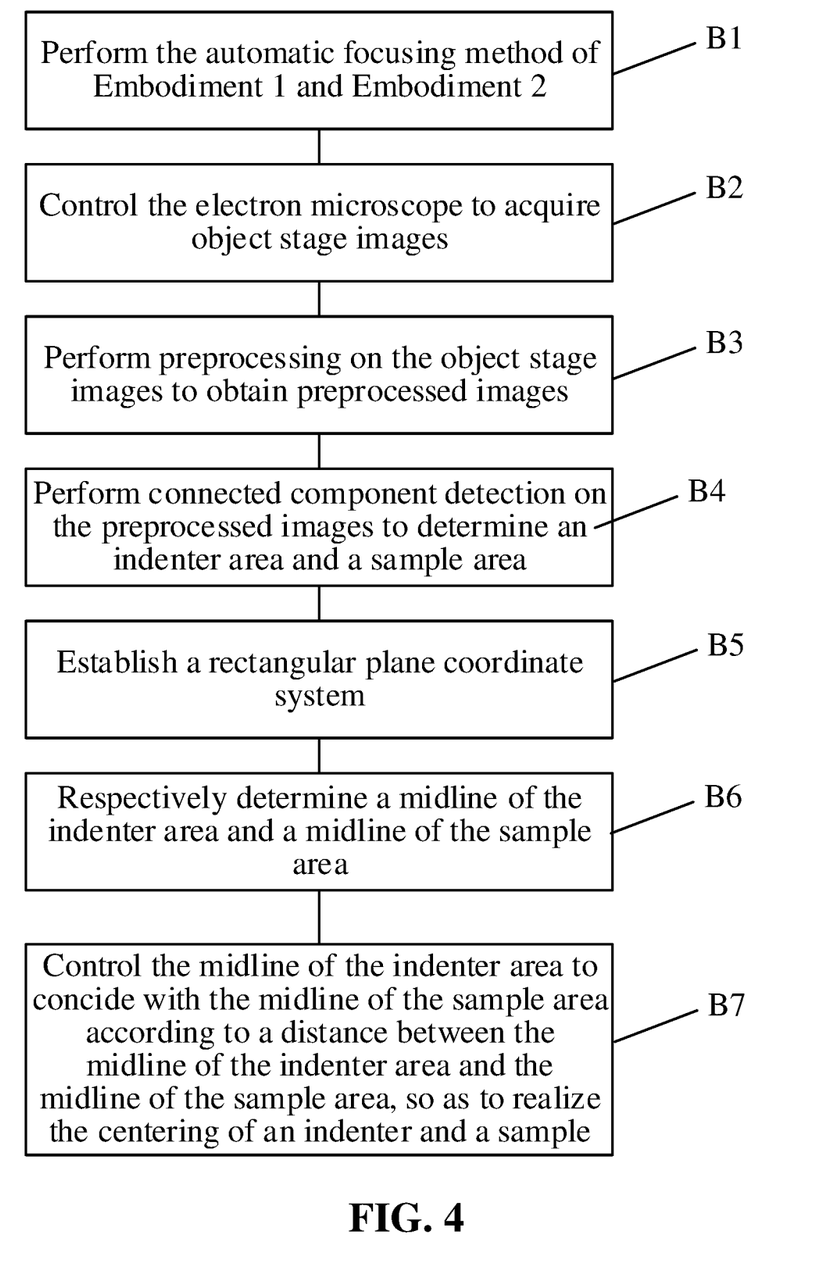
FIG. 4 is a flowchart of a machine vision-based automatic centering method according to Embodiment 3 of the present disclosure.

In the present embodiment, a machine vision-based automatic centering method is further provided. As shown in FIG. 4, the automatic centering method includes the following steps B1 to B7.

In step B1, the automatic focusing method as described in Embodiment 1 and Embodiment 2 are performed, so that the electron microscope can obtain a clear object stage image.

In step B2, the electron microscope is controlled to scan and acquire the object stage image. The object stage image includes an indenter and a sample arranged opposite to the indenter, a traveling direction of the indenter is perpendicular to a fixing plane of the sample, and an imaging direction of the electron microscope is perpendicular to the traveling direction of the indenter.

In step B3, preprocessing is performed on the object stage image to obtain a preprocessed image. The preprocessing includes filtering processing, noise elimination processing, and binarization processing performed in sequence. In the present embodiment, related image processing is realized by using a Python-oriented OpenCV algorithm library. OpenCV is an open source computer vision library, which can provide rich image processing interface functions. Corresponding functions can be realized through reasonable collocation of these functions. Specifically, filtering processing is performed on a clear image obtained by automatically focusing, so as to eliminate noise; and thresholding processing is performed to obtain a binary image.

In step B4, connected component detection is performed on the preprocessed image to determine an indenter area and a sample area. Specifically, in the present embodiment, burrs are removed by using a morphological opening-and-closing operation, and the connected component detection is performed on the binary image with the burrs removed, so as to obtain a plurality of areas and realize segmentation. Three areas with the largest area are taken as preselected areas of the indenter and the sample. Template matching is performed to find a target indenter and sample in the image.

In step B5, a rectangular plane coordinate system XOY is established; an arbitrary point is selected from the object stage image as an origin O. The rectangular plane coordinate system XOY is established by taking a straight line that passes through the origin O and is parallel to the traveling direction of the indenter as an X axis and a straight line that passes through the origin O and is perpendicular to the X axis as a Y axis.

In step B6, a midline of the indenter area and a midline of the sample area are respectively determined. Both the midline of the indenter area and the midline of the sample area are parallel to the X axis and perpendicular to the Y axis. In the present embodiment, the midline of the indenter area is determined according to the following formula:

$$y_{indenter} = \frac{\sum_{i=1}^{n} y_i}{n},$$

where $y_{indenter}$ is the midline of the indenter area, $y_i$ is a Y-axis coordinate of the i-th pixel in the indenter area, and n is the number of the pixels in the indenter area.

The midline of the sample area is determined according to the following formula:

$$y_{sample} = \frac{\sum_{j=1}^{m} y_j}{m},$$

where $y_{sample}$ is the midline of the sample area, $y_j$ is a Y-axis coordinate of the jth pixel in the sample area, and m is the number of the pixels in the sample area.

Figure 5:
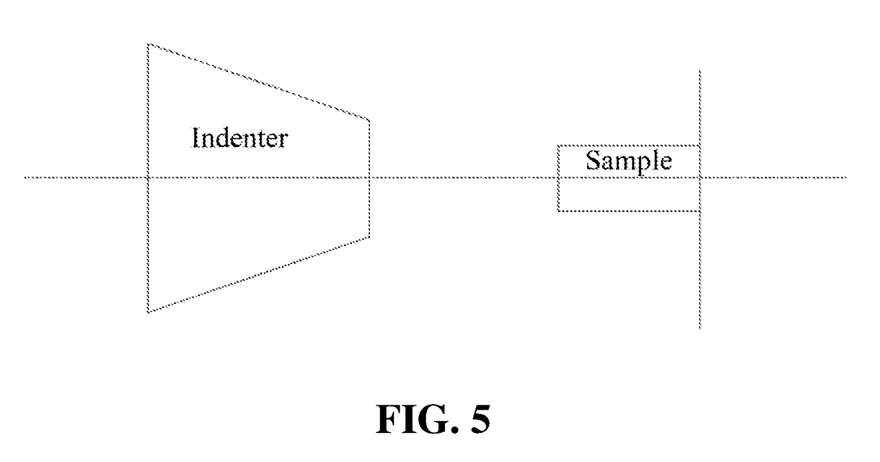
FIG. 5 is schematic diagram of an arrangement of an indenter and a sample after the automatic centering method according to Embodiment 3 of the present disclosure is completed.

In step B7, the midline of the sample area is controlled to coincide with the midline of the indenter area according to the distance between the midline of the indenter area and the midline of the sample area, so as to realize the centering of the indenter and the sample, as shown in FIG. 5. In the present embodiment, the deviation information of the midline of the indenter area and the midline of the sample area is taken as a feedback signal, which is subjected to Proportional, Integral and Differential (PID) regulation to output a stepping motor control signal, so as to form PID closed-loop control. This ensures that a sample stage quickly, accurately, and stably reaches the position where the midline of the sample area coincides with the midline of the indenter are under the driving of a stepping motor.

Embodiment 4

In the present embodiment, an apparatus for a machine vision-based automatic centering and focusing method is provided. The device mainly includes an SEM, a software and hardware platform corresponding to an SEM control computer, an in-situ nano-indentation instrument (including a stepping motor, a sample stage, a diamond indenter, etc.), and a matched control system, which cooperate with one another to implement image processing, image segmentation, focusing definition evaluation, centering of an indenter and a sample, and sending and receiving movement instructions.

When focusing needs to be performed, the SEM is responsible for acquiring images in real time and sending the images to the computer. The motor is configured to drive the object stage to move. An upper limit position and a lower limit position of focusing process software are set. The object stage is moved from the lower limit position to the upper limit position. The image definition of the obtained images is calculated according to a focusing evaluation function, so as to obtain a position corresponding to the highest image definition during moving. The motor is controlled to be moved to the position, so as to complete automatic focusing. That is, an object stage control apparatus is responsible for adjusting the focus length of the SEM. During the operation of the SEM, the computer sets an area where the diamond indenter is located as a target area, according to the images acquired by the SEM, and performs Fourier filtering on the acquired images. For each filtered image, the focus performance of a diamond indenter area in the image is evaluated and analyzed by using the focusing evaluation function, and a focusing evaluation function curve corresponding to each focusing is obtained. When an extreme point of the evaluation function is reached, the focusing of the SEM is completed.

When centering needs to be performed, images are photographed and captured in real time by using the SEM. Automatic centering is started when the target indenter and the sample appear in the field of view together. An SEM operation platform sends an instruction to the control apparatus. After receiving the instruction, the apparatus enables automatic centering and starts to analyze image content. An indenter profile and a sample profile in the image are respectively extracted through an OpenCV-based image processing algorithm, the image is segmented to find a segmentation center. The distance between an indenter center and a sample center is calculated and is sent to the control apparatus in real time. According to a position deviation and through PID analysis, the control apparatus outputs a control signal to each stepping motor, and then the sample stage is controlled to move, so that the indenter center is aligned with the sample center, and the position deviation is eliminated gradually. When the position deviation is 0, the automatic centering is completed.

Embodiment 5

Figure 6:
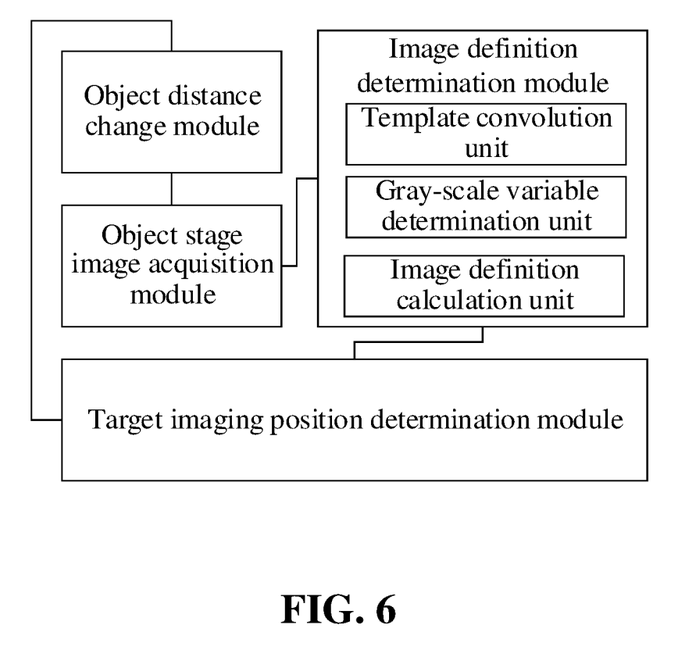
FIG. 6 is a schematic structural diagram of a machine vision-based automatic focusing system according to Embodiment 5 of the present disclosure.

The method in Embodiment 1 of the present disclosure may also be implemented by means of the architecture of a machine vision-based automatic focusing system as shown in FIG. 6. The machine vision-based automatic focusing system may include an object distance changing module, an object stage image acquisition module, an image definition determination module, and a target imaging position determination module. Some modules may also have sub-units for realizing their functions. For example, the image definition determination module further includes a template convolution unit, a gray-scale variation determination unit, and an image definition calculation unit. Of course, the architecture as shown in FIG. 6 is only exemplary. One or at least two components in the system as shown in FIG. 6 may be omitted according to actual needs when different functions are realized.

Embodiment 6

Figure 7:
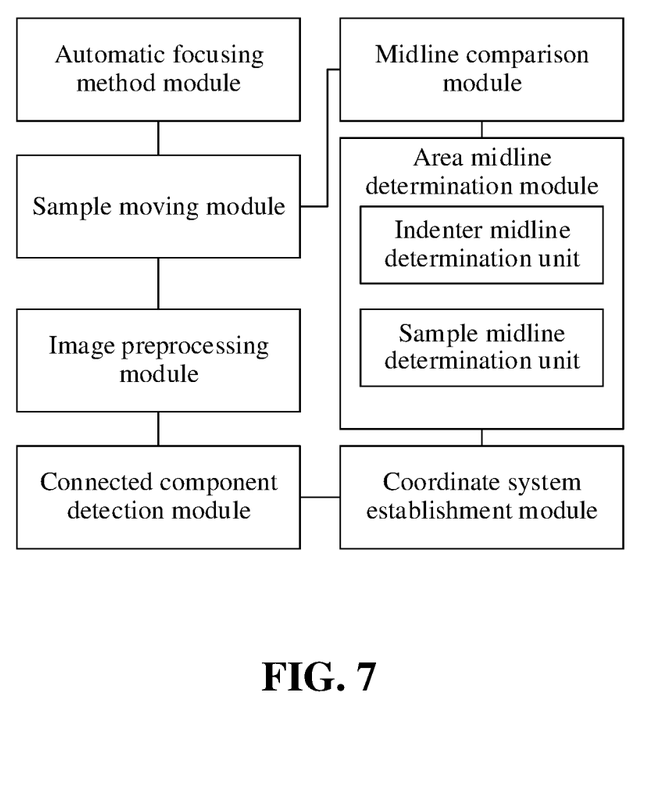
FIG. 7 is a schematic structural diagram of a machine vision-based automatic centering system according to Embodiment 6 of the present disclosure.

The method in Embodiment 3 of the present disclosure may also be implemented by means of the architecture of a machine vision-based automatic centering system as shown in FIG. 7. The machine vision-based automatic centering system may include an automatic focusing method module, a sample moving module, an image preprocessing module, a connected component detection module, a coordinate system establishment module, an area midline determination module, and a midline comparison module. Some modules may also have sub-units for realizing their functions. For example, the area midline determination module further includes an indenter midline determination unit and a sample midline determination unit. Of course, the architecture as shown in FIG. 7 is only exemplary. One or at least two components in the system as shown in FIG. 7 may be omitted according to actual needs when different functions are realized.

A program part in the technology can be considered as a "product" or an "article" in the form of executable code and/or related data, which is participated in or realized by a computer-readable medium. Tangible and permanent storage media may include memory r storage for any computer, processor, or similar devices, or associated modules, for example, various semiconductor memories, magnetic tape drives, magnetic disk drives, or similar devices that can provide storage functions for software.

All or part of software may sometimes communicate over a network, such as the Internet or other communication networks. Such communication may load software from one computer device or processor to another. For example, the software is loaded from a server or host computer of a video object detection device to a hardware platform of a computer environment, or other computer environments implementing the system, or a system with similar functions related to providing information required for object detection. Therefore, another medium capable of transmitting software elements may also be used as a physical connection between local devices, such as optical waves, electrical waves, and electromagnetic waves, which are propagated through cables, optical cables, air, etc. The physical media over which a carrier wave travels, such as cables, wireless links, optical cables and other similar devices, can also be considered as the media for carrying software. As used herein, unless otherwise limited to tangible "storage" media, other terms that refer to computer or machine "readable media" may refer to media that participate in the execution of any instructions by a processor.

Specific examples are applied herein, but the above descriptions only describe the principles and implementations of the present disclosure. The description of the above embodiments is only intended to facilitate an understanding of the method and the core idea of the present disclosure. Those skilled in the art should understand that the various modules or steps of the present disclosure described above can be implemented by a general-purpose computer apparatus. Alternatively, they can be implemented by program codes executable by the computing apparatus, so that they can be stored in a storage device and executed by the computing apparatus, or they can be separately made into various integrated circuit modules, or a plurality of modules or steps thereof may be made into a single integrated circuit module for implementing. The present disclosure is not limited to any combination of specific hardware and software.

Meanwhile, for those of ordinary skill in the art, there will be changes in the specific implementation and application scope according to the idea of the present disclosure. In conclusion, the content of the specification shall not be construed as a limitation to the present disclosure.

What is claimed is:

1. A machine vision-based automatic centering method, comprising:
   controlling an object stage to move in an imaging distance range of an electron microscope, so as to change an object distance between the object stage and the electron microscope;
   acquiring a plurality of object stage images scanned by the electron microscope when the object distance between the object stage and the electron microscope changes;
   for each object stage image, calculating image definition of the object stage image according to a gray-scale value of each pixel in the object stage image;
   assuming an imaging position corresponding to the object stage image with a maximum image definition among the plurality of object stage images as a target imaging position;
   controlling the object stage to move to the target imaging position;
   controlling the electron microscope to scan and acquire the object stage image, wherein the object stage image comprises an indenter and a sample arranged opposite to the indenter, a traveling direction of the indenter is perpendicular to a fixing plane of the sample, and an imaging direction of the electron microscope is perpendicular to the traveling direction of the indenter;
   performing preprocessing on the object stage image to obtain a preprocessed image, wherein the preprocessing comprises filtering processing, noise elimination processing, and binarization processing performed in sequence;
   performing connected component detection on the preprocessed image to determine an indenter area and a sample area;
   selecting an arbitrary point in the object stage image as an origin O, and establishing a rectangular plane coordinate system XOY by assuming a straight line that passes through the origin O and is parallel to the traveling direction of the indenter as an X axis and a straight line that passes through the origin O and is perpendicular to the X axis as a Y axis;

respectively determining a midline of the indenter area and a midline of the sample area, wherein both the midline of the indenter area and the midline of the sample area are parallel to the X axis and perpendicular to the Y axis; and controlling the midline of the sample area to coincide with the midline of the indenter area according to the distance between the midline of the indenter area and the midline of the sample area.

2. The automatic centering method according to claim 1, wherein the midline of the indenter area is determined according to following formula:

$$y_{indenter} = \frac{\sum_{i=1}^{n} y_i}{n}$$

wherein $y_{indenter}$ is the midline of the indenter area, $y_i$ is a Y-axis coordinate of a i-th pixel in the indenter area, and n is a number of the pixels in the indenter area;

the midline of the sample area is determined according to following formula:

$$y_{sample} = \frac{\sum_{j=1}^{m} y_j}{m}$$

wherein $y_{sample}$ is the midline of the sample area, $y_j$ is a Y-axis coordinate of a j-th pixel in the sample area, and m is a number of the pixels in the sample area.

3. A machine vision-based automatic centering system, wherein the automatic centering method according to claim 1 is run when the automatic centering system is implemented by a computer.

4. The automatic entering method according to claim 1, wherein the calculating image definition of the object stage image according to a gray-scale value of each pixel in the object stage image comprises:

performing template convolution on the object stage image by using a Laplace operator, so as to obtain a high-frequency component of the object stage image; and calculating an image definition value of the object stage image according to an image definition evaluation function and the high-frequency component of the object stage image.

5. The automatic centering method according to claim 4, wherein the Laplace operator is as shown in following formula:

$$z(x,y)=g(x-1,y)+g(x+1,y)+g(x,y-1)+g(x,y+1)-4g(x,y)$$
$$x \in [1,M-1], y \in [1,N-1]$$

wherein g(x, y) is a gray-scale value at a pixel point (x, y) in the object stage image, M is a number of pixel columns of the object stage image, N is a number of pixel rows of the object stage image, and z(x, y) is a gray-scale value at the pixel point (x, y) in the high-frequency component of the object stage image.

6. The automatic centering method according to claim 4, wherein the image definition evaluation function is as shown in following formula:

$$f = \frac{1}{MN} \sum_{(x,y)} z(x, y),$$

wherein f is the image definition value of the object stage image, M is the number of pixel columns of the object stage image, N is the number of pixel rows of the object stage image, and z(x, y) is the gray-scale value at the pixel point (x, y) in the high-frequency component of the object stage image.

7. The automatic centering method according to claim 1, wherein the calculating image definition of the object stage image according to a gray-scale value of each pixel in the object stage image comprises:

for each pixel point in the object stage image, performing a difference operation on a gray-scale value of the pixel point and gray values of a plurality of pixel points adjacent to the pixel point to obtain a gray-scale variation of the pixel point; and determining an image definition value of the object stage image according to the gray-scale variation of each pixel point in the object stage image.

8. The automatic centering method according to claim 7, wherein the gray-scale variation of each pixel point in the object stage image is calculated according to following formula:

$$G(x,y)=|g(x,y)-g(x+1,y)|+|g(x,y)-g(x,y+1)|,$$

wherein G(x, y) is a gray-scale variation at the pixel point (x, y) in the object stage image, and g(x, y) is the gray-scale value at the pixel point (x, y) in the object stage image.

9. The machine vision-based automatic centering system according to claim 3, wherein the midline of the indenter area is determined according to following formula:

$$y_{indenter} = \frac{\sum_{i=1}^{n} y_i}{n}$$

wherein $y_{indenter}$ is the midline of the indenter area, $y_i$ is a Y-axis coordinate of a i-th pixel in the indenter area, and n is a number of the pixels in the indenter area;

the midline of the sample area is determined according to following formula:

$$y_{sample} = \frac{\sum_{j=1}^{m} y_j}{m}$$

wherein $y_{sample}$ is the midline of the sample area, $y_j$ is a Y-axis coordinate of a j-th pixel in the sample area, and m is a number of the pixels in the sample area.

10. The machine vision-based automatic centering system according to claim 3, wherein the calculating image definition of the object stage image according to a gray-scale value of each pixel in the object stage image comprises:

performing template convolution on the object stage image by using a Laplace operator, so as to obtain a high-frequency component of the object stage image; and calculating an image definition value of the object stage image according to an image definition evaluation function and the high-frequency component of the object stage image.

11. The machine vision-based automatic centering system according to claim 10, wherein the Laplace operator is as shown in following formula:

$$z(x,y)=g(x-1,y)+g(x+1,y)+g(x,y-1)+g(x,y+1)-4g(x,y)$$
$$x\in[1,M-1], y\in[1,N-1]$$

wherein g(x, y) is a gray-scale value at a pixel point (x, y) in the object stage image, M is a number of pixel columns of the object stage image, N is a number of pixel rows of the object stage image, and z(x, y) is a gray-scale value at the pixel point (x, y) in the high-frequency component of the object stage image.

12. The machine vision-based automatic centering system according to claim 10, wherein the image definition evaluation function is as shown in following formula:

$$f = \frac{1}{MN}\sum_{(x,y)} z(x, y),$$

wherein f is the image definition value of the object stage image, M is the number of pixel columns of the object stage image, N is the number of pixel rows of the object stage image, and z(x, y) is the gray-scale value at the pixel point (x, y) in the high-frequency component of the object stage image.

13. The machine vision-based automatic centering system according to claim 3, wherein the calculating image definition of the object stage image according to a gray-scale value of each pixel in the object stage image comprises:

for each pixel point in the object stage image, performing a difference operation on a gray-scale value of the pixel point and gray values of a plurality of pixel points adjacent to the pixel point to obtain a gray-scale variation of the pixel point; and determining an image definition value of the object stage image according to the gray-scale variation of each pixel point in the object stage image.

* * * * *